United States Patent
Lin et al.

(10) Patent No.: US 7,739,095 B2
(45) Date of Patent: Jun. 15, 2010

(54) METHOD FOR DETERMINING BEST AND WORST CASES FOR INTERCONNECTS IN TIMING ANALYSIS

(75) Inventors: Xi-Wei Lin, Fremont, CA (US); Dipankar Pramanik, Saratoga, CA (US)

(73) Assignee: Synopsys, Inc., Mountain View, CA (US)

( * ) Notice: Subject to any disclaimer, the term of this patent is extended or adjusted under 35 U.S.C. 154(b) by 762 days.

(21) Appl. No.: 11/685,250

(22) Filed: Mar. 13, 2007

(65) Prior Publication Data

US 2008/0228460 A1    Sep. 18, 2008

(51) Int. Cl.
    *G06F 17/50* (2006.01)
(52) U.S. Cl. .............................. 703/14; 703/19; 716/6; 438/14
(58) Field of Classification Search .............. 703/14, 703/15, 19; 716/6, 8; 438/689, 14; 331/107 SL
    See application file for complete search history.

(56) References Cited

U.S. PATENT DOCUMENTS

| | | | | |
|---|---|---|---|---|
| 5,666,290 | A * | 9/1997 | Li et al. ........................... | 716/8 |
| 5,933,356 | A * | 8/1999 | Rostoker et al. ............... | 703/15 |
| 6,018,623 | A * | 1/2000 | Chang et al. .................... | 716/6 |
| 6,189,131 | B1 * | 2/2001 | Graef et al. ..................... | 716/8 |
| 6,286,126 | B1 * | 9/2001 | Raghavan et al. ............... | 716/6 |
| 2001/0034595 | A1 * | 10/2001 | Yamaguchi .................. | 703/19 |
| 2002/0037596 | A1 | 3/2002 | Yamaguchi | |
| 2003/0228757 | A1 * | 12/2003 | Jung ........................... | 438/689 |
| 2007/0046385 | A1 * | 3/2007 | Forbes et al. ........... | 331/107 SL |
| 2007/0099314 | A1 * | 5/2007 | Chen et al. ..................... | 438/14 |

OTHER PUBLICATIONS

Lee, M., "A multilevel parasitic interconnect capacitance modeling and extraction for reliable VLSI on-chip clock delay evaluation", IEEE 1998.*
Sylvester et al., "Analytical modeling and characterization of deep submicrometer interconnect", IEEE 2001.*
Labun, A., "Rapid method to account for process variation in full-chip capacitance extraction", IEEE 2004.*
Becer et al., "An analytical model for delay and crosstalk estimation with application to decoupling", IEEE 2000.*

(Continued)

*Primary Examiner*—Paul L Rodriguez
*Assistant Examiner*—Kandasamy Thangavelu
(74) *Attorney, Agent, or Firm*—Warren S. Wolfeld; Haynes Beffel & Wolfeld, LLP

(57) ABSTRACT

Roughly described, signal propagation delay values are estimated for a plurality of interconnects in a circuit design. For each interconnect, the propagation delay value(s) are estimated in dependence upon a preliminary approximate determination of whether the signal propagation delay is dominated more by an interconnect capacitance term or by an interconnect capacitance and resistance product term. If it is dominated more by the interconnect capacitance term, then the parameter values used for a minimum propagation delay calculation are obtained assuming a smallest capacitance process variation case and the parameter values used for a maximum propagation delay calculation are obtained assuming a largest capacitance process variation case. If the signal propagation delay is dominated more by the interconnect capacitance and resistance product term, then the opposite assumptions are made. Preferably the approximate determination is made by comparing Rint to k*Rd.

27 Claims, 12 Drawing Sheets

OTHER PUBLICATIONS

Sim et al., "A unified RLC model for high speed on-chip interconnects", IEEE 2003.*

Achar et al., "Simulation of high speed interconnects", IEEE 2001.*

Liu, Ying, et al. "Impact of Interconnect Variations on the Clock Skew of a Gigahertz Microprocessor," Proceeding sof the 37th Design Automation Conference, 2000, 168-171.

Agarwal, Kanak, et al. "Variational Delay Metrics for Interconnect Timing Analysis," Proc. 41st Design Automation Conf 2004, 381-384.

Power, James A., et al. "Relating Statistical MOSFET Model Parameter Variabilities to IC Manufacturing Process Fluctuations Enabling Realistic Worst Case Design," IEEE Transactions on Semiconductor Mfg. 7(3) Aug. 1994, 306-318.

Acar, Emrah, et al., "Assessment of True Worst Case Circuit Performance Under Interconnect Parameter Variations," IEEE 2001, 431-436.

Huebbers, Frank, at al. "Computation of Accurate Interconnect Process Parameter Values for Performance Corners under Process Variations," 43d ACM/IEEE Design Automation Conf Jul. 2006, 797-800.

Abbaspour, Soroush, et al., "VGTA: Variation-Aware Gate Timing Analysis," Proc. 2005 ICCD IEEE, 6 pages.

* cited by examiner

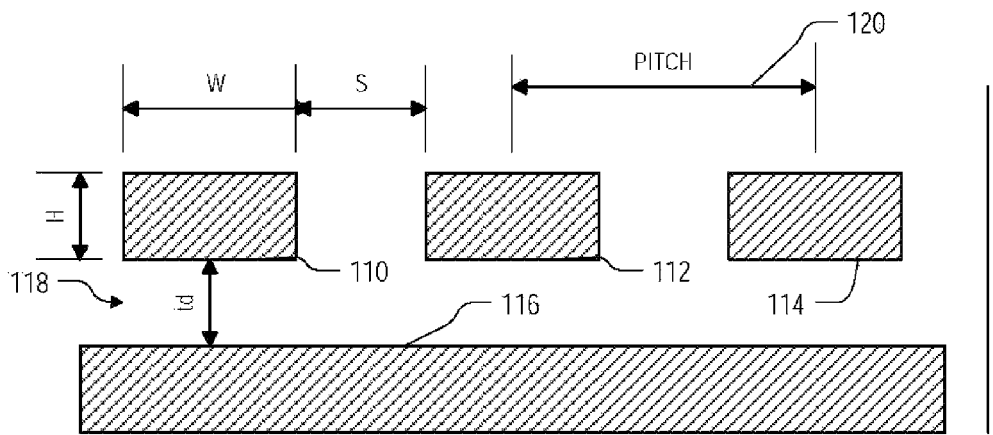
FIG. 1A (NOMINAL)
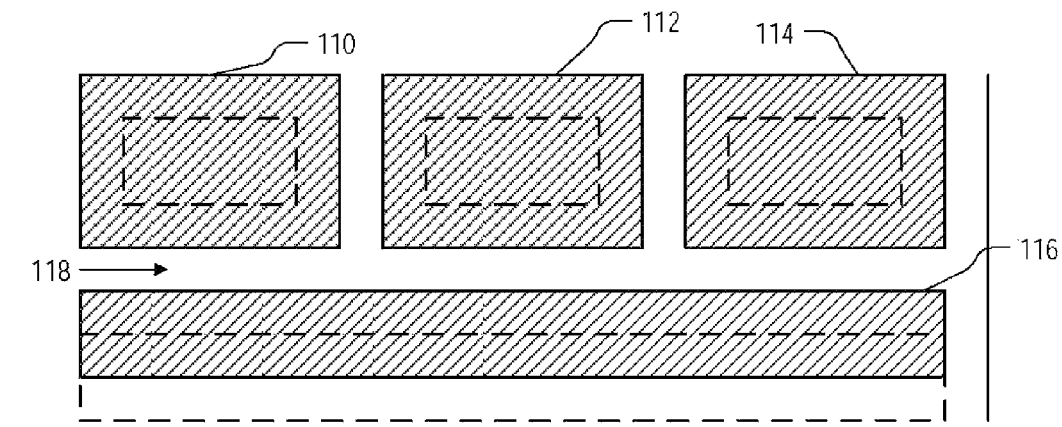
FIG. 1B ("WORST" (LARGEST) CAPACITANCE)
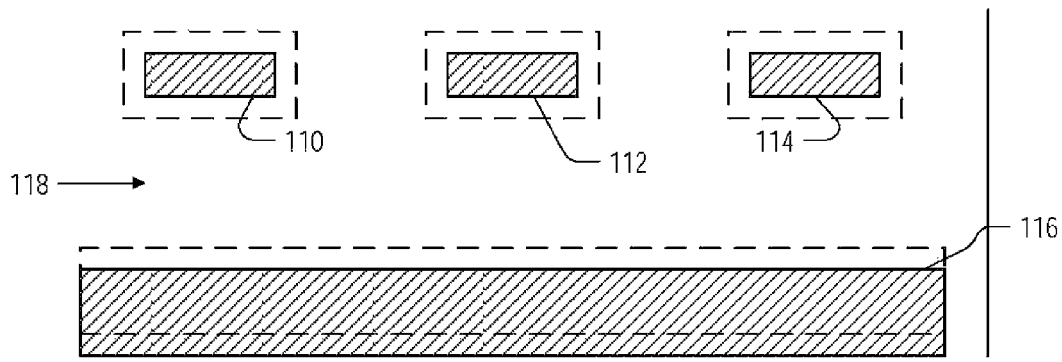
FIG. 1C – "BEST" (SMALLEST) CAPACITANCE

METHOD FOR DETERMINING BEST AND WORST CASES FOR INTERCONNECTS IN TIMING ANALYSIS

BACKGROUND

The present invention relates to integrated circuit simulation technology, and more particularly to analysis of the timing of signal propagation.

Because of the long time required and the large expense involved for fabricating test versions of integrated circuits, it has become commonplace to simulate the operation of circuit designs as thoroughly as possible before fabricating a prototype. In this way corrections can be made before the time and expense of prototype fabrication is incurred. One parameter that is typically tested in these simulations is the propagation delay, from the output of a source node to the input of a destination node. Typically it is required that the propagation time must be short enough such that when added to the setup time requirement of the destination node, a signal asserted at the source node will reach the destination node soon enough to be stable when required by the destination node. The propagation time also must be long enough such that when added to the hold time requirement of the destination node, the release of a signal at the source node will not reach the destination node too early.

Process variations in semiconductor manufacturing have become critical factors to consider for circuit designs, especially as the device feature size shrinks into nanometer scale. Product yield is at increasing risk unless process variations and their impacts are properly modeled in the simulations. One area of process variations concerns metal interconnects. It has been found that the metal wire cross-section (height and width), as well as the spacing between adjacent metal lines, may vary by more than 10% from location to location on a single wafer and from wafer to wafer, leading to more than 20% fluctuation in resistance (R) and capacitance (C) relative to their nominal values. The values of R and C for an interconnect largely determine the signal propagation time from a source node to a destination node, so the uncertainty in R and C results in uncertainty in the propagation time. A product therefore may fail in timing if the large uncertainty in R and C is not properly taken into account when calculating propagation delays.

The uncertainties in resistance and capacitance can be taken into account during simulations by ensuring that the maximum propagation time in a particular interconnect is short enough such that when added to the setup time requirement of the destination node, a signal asserted at the source node will reach the destination node soon enough to be stable when required by the destination node; and that the minimum propagation time in the interconnect is long enough such that the release of a signal at the source node will not reach the destination node before the hold time requirement of the destination node expires. Thus it becomes important to know the minimum and maximum possible propagation times for each interconnect under study. One cannot determine these absolutely, of course, because there will always be a small possibility of particular set of conditions in which signals propagate slightly faster or slightly more slowly. Usually some practical definition of "minimum" and "maximum" is adopted.

One common method for determining the minimum and maximum propagation times for an interconnect is to assume that the whole design is either under the "best case" or "worst case" for capacitance (C), or for the product of resistance and capacitance (RC). This practice may give rise to misleading results for two reasons. First, R and C variations are often correlated: a particular interconnect that turns out on fabrication to exhibit better capacitance performance, also tends to exhibit worse resistance performance, and vice-versa. Second, the circuit responses to variations in R or C often depend on the driving strength of the source and the R and C values themselves.

For instance, propagation delays are sometimes assumed to be shortest when the C value is the smallest. But a variation in which C is smallest is often the same variation that exhibits the largest value for R, which typically would be assumed to yield the longest propagation delay. One therefore cannot generalize that a device in which a particular interconnect has a capacitance at the small end of the range of possible capacitances, or a resistance*capacitance product at the small end of the range of possible such products, yields the shortest propagation delays. Nor can one generalize that a device in which a particular interconnect has a capacitance at the large end of the range of possible capacitances, or a resistance*capacitance product at the high end of the range of possible products, yields the longest propagation delay for the particular interconnect. Furthermore, it can be seen that if the entire design is analyzed using "best case" capacitances, conditions may be such that one individual interconnect may exhibit the shortest propagation delay while another individual interconnect may exhibit the longest propagation delay. If the two interconnects happen to be in the same delay path (e.g. in a chain of several drivers interconnected by metal wires), one would not be able to assert whether the overall path delay is the shortest or longest. Consequently, one does not know whether the delay path satisfies the timing requirements for the design to meet product specifications.

Therefore, there is a need to assess the effects on interconnect signal propagation delay caused by different process variations, more accurately than is possible using existing methods.

SUMMARY OF THE INVENTION

According to the invention, roughly described, minimum and/or maximum signal propagation delay values are estimated for each of a plurality of interconnects in a circuit design. For each particular interconnect, the propagation delay value(s) are estimated in dependence upon a preliminary approximate determination of whether the signal propagation delay is dominated more by an interconnect capacitance term or by an interconnect capacitance and resistance product term. If it is dominated more by the interconnect capacitance term, then the parameter values used for the minimum propagation delay calculation are obtained assuming a smallest capacitance process variation case and the parameter values used for the maximum propagation delay calculation are obtained assuming a largest capacitance process variation case. If the signal propagation delay is dominated more by the interconnect capacitance and resistance product term, then the parameter values used for the minimum propagation delay calculation are obtained assuming the largest capacitance process variation case and the parameter values used for the maximum propagation delay calculation are obtained assuming the smallest capacitance process variation case.

Preferably the approximate determination can be made by comparing the resistance Rint of the interconnect to a predetermined factor k times the output impedance Rd driving the interconnect. Rint<k*Rd indicates that the signal propagation delay is dominated more by an interconnect capacitance term, whereas Rint>k*Rd indicates that the signal propagation delay is dominated more by the interconnect capacitance and resistance product term.

The factor k can be extracted through circuit simulations, or, a default value of k=1 can be used. The value of Rd for each driver can be determined by circuit simulations and stored in a database for each driver type in the design. It can also be derived from the rate (r) of driver delay versus the output capacitance (that is, Rd=r).

BRIEF DESCRIPTION OF THE DRAWINGS

FIGS. 1A, 1B and 1C are symbolic diagrams of a portion of an integrated circuit device fabricated under nominal, worst and best capacitance case process conditions, respectively.

DETAILED DESCRIPTION

Figure 2:
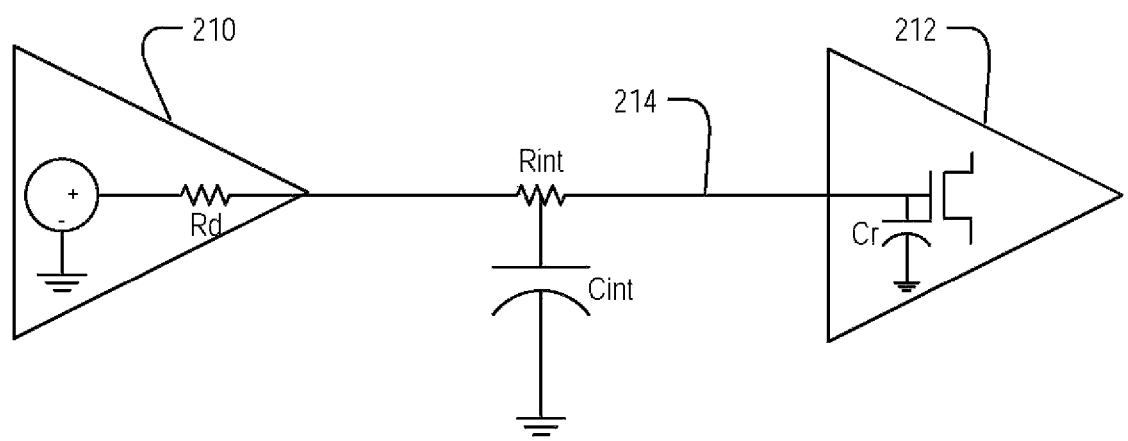
FIG. 2 illustrates a circuit model of an interconnect.

The following detailed description is made with reference to the figures. Preferred embodiments are described to illustrate the present invention, not to limit its scope, which is defined by the claims. Those of ordinary skill in the art will recognize a variety of equivalent variations on the description that follows.

FIG. 1A is a symbolic diagram of a portion of an integrated circuit device. Shown are three metal conductors 110, 112 and 114, extending into the plane of the page and viewed in cross-section, and a fourth conductor or ground plane 116 located in a layer below and separated by a dielectric layer 118. For this illustration, the conductors 110, 112 and 114 have a pitch 120. They all have a width W, a thickness H, and are spaced from each other by a distance S. The conductors 110, 112 and 114 are all separated from the underlying layer 116 by spacing td. FIG. 1A may illustrate the geometric characteristics of a device fabricated exactly as specified in the layout file. It is referred to herein as the "nominal" case, or a "typical" case. But fabrication processes often produce actual devices which differ somewhat from the nominal geometries, some of which turn out to have smaller or larger values for the distances H, W, S and td. The capacitances of the metal conductors 110, 112 and 114 in such cases, therefore can be either greater or less than the capacitances for the nominal case of FIG. 1A.

FIG. 1B, for example, shows a variation that is usually considered to be the "worst" case for the capacitance of conductors 110, 112 and 114. In this figure the nominal geometry from FIG. 1A is illustrated with dashed lines and the geometry as actually fabricated is illustrated with a solid lines. It can be seen that the conductors are enlarged in cross-section, in both height and width, thereby reducing the spacing between them and increasing the area (parallel vertical walls) acting in a parallel-plate capacitive manner. The lower surface of the conductors 110, 112 and 114 acting in a parallel-plate capacitive manner with the underlying layer 116, is also wider than the nominal. Additionally, the dielectric 118 is also thinner in this variation, which reduces the spacing td between the conductors 110, 112 and 114 and the underlying layer 116. All of these changes serve to increase the capacitance in the conductors 110, 112 and 114 to a "worst case" capacitance.

As an opposite case, FIG. 1C shows a variation that is usually considered to be the "best" case for the capacitance of conductors 110, 112 and 114. As with FIG. 1B, in FIG. 1C the nominal geometry from FIG. 1A is illustrated with dashed lines and the geometry as actually fabricated is illustrated with a solid lines. It can be seen that the conductors are narrowed in cross-section, in both height and width, thereby increasing the spacing between them and decreasing the area (parallel vertical walls) acting in a parallel-plate capacitive manner between them. The lower surface of the conductors 110, 112 and 114 acting in a parallel-plate capacitive manner with the underlying layer 116, is narrower than the nominal. Additionally, the dielectric 118 is thicker in this variation, which increases the spacing td between the conductors 110, 112 and 114 and the underlying layer 116. All of these changes serve to decrease the capacitance in the conductors 110, 112 and 114 to a "best case" capacitance.

In the past, when analyzing a layout for "worst case" propagation delays, it was common to assume that all the interconnects are fabricated as shown in FIG. 1B, the "worst capacitance" case. Similarly, when analyzing a layout for "best case" propagation delays, it was common to assume that all the interconnects are fabricated as shown in FIG. 1C, the "best capacitance" case. But it can be seen that in FIG. 1B, the "worst capacitance" case, the resistance in the conductors 110, 112 and 114 is reduced, due to the larger cross-sectional area of the conductors. This corresponds to a "best resistance" case. Similarly, it can be seen that in FIG. 1C, the "best capacitance" case, the resistance in the conductors 110, 112 and 114 is increased, due to the smaller cross-sectional area of the conductors. Because interconnect resistance also affects propagation delays, it was misleading to assume that the "best capacitance" case was also the best case for propagation delays, and that the "worst capacitance" case was also the worst case for propagation delays.

As an alternative, one might try constructing a best case that minimizes the product of resistance and capacitance in the conductors, and a worst case that maximizes it. But that, too, fails to produce reliable best and worst cases for propagation delays because other factors such as driver resistance, receiver capacitance, and the length of the conductor all can affect propagation delays to such an extent that the worst case product of resistance and capacitance may or may not correspond to the worst case propagation delay for a particular conductor.

Figure 3:
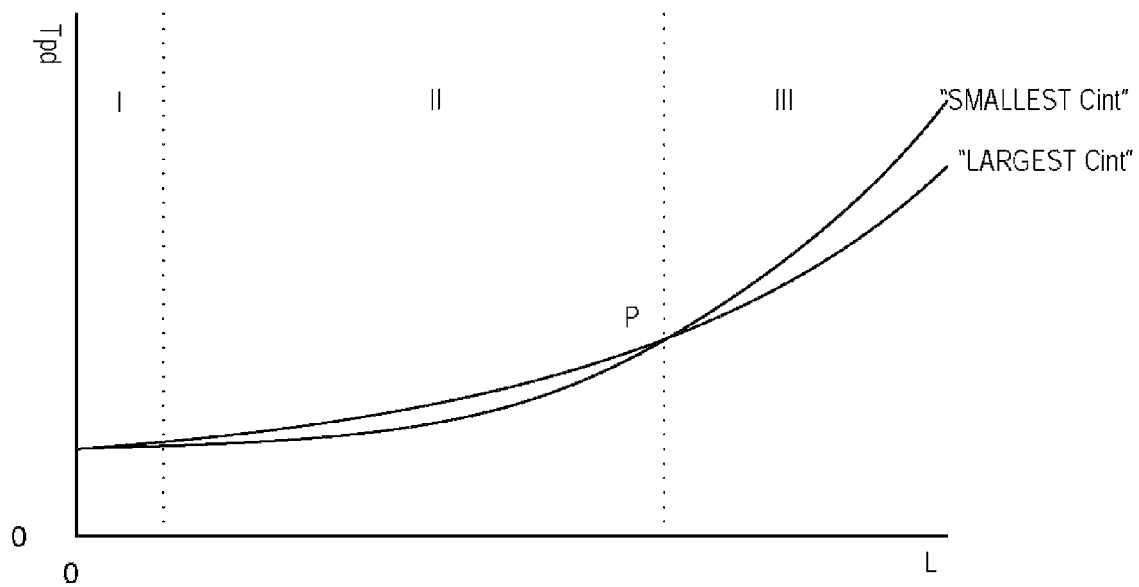
FIG. 3 is an illustrative plot showing the propagation delay for an arbitrary interconnect at various lengths, for the "worst capacitance" case of FIG. 1B and for the "best capacitance" case of FIG. 1C.

FIG. 3 is an illustrative plot showing the propagation delay for an arbitrary interconnect at various lengths, for the "worst capacitance" case of FIG. 1B and for the "best capacitance" case of FIG. 1C. Because it may not be accurate to assume that these cases are in fact "worst" or "best" for propagation delay purposes, they are sometimes referred to herein as the "largest capacitance" case and the "smallest capacitance" case, respectively. It can be seen that for very short interconnects, it does not matter which of these cases are assumed when calculating Rint, Cint, and the resulting Tpd because any uncertainty in resistance and capacitance of the interconnect conductor has little if any bearing on propagation delay. Even using the nominal case of FIG. 1A would produce the roughly same propagation delay values. A cross-over occurs, however, at a point P. For longer interconnects that are still shorter than the cross-over point length, the "largest capacitance" case of FIG. 1B corresponds to the "worst" propagation delay and the "smallest capacitance" case of FIG. 1C corresponds to the "best" propagation delay. For interconnects longer than the cross-over point length, the "smallest capacitance" case of FIG. 1C corresponds to the "worst" propagation delay and the "largest capacitance" case of FIG. 1B corresponds to the "best" propagation delay. Three "regimes" can therefore be defined: a first regime ("Regime I") for very short interconnects, a second regime ("Regime II") for longer interconnects that are still shorter than the cross-over point, and a third regime ("Regime III") for interconnects that are longer than the cross-over point. It can also be seen that very near the cross-over point P, as in Regime I, it does not matter which case is assumed because any uncertainty in resistance and capacitance of the interconnect conductor has little if any bearing on propagation delay. Thus when choosing between Regime II and Regime III, it is sufficient if the cross-over point P is identified only approximately.

FIG. 2 illustrates a circuit model of an interconnect for purposes of calculating a propagation delay. It comprises a source driver 210 having an output resistance Rd, a receiver device 212 having an input gate capacitance Cr, and the interconnect conductor itself 214 having resistance Rint and a capacitance Cint. The values of Rint and Cint are roughly proportional to the length L of the interconnect, but Rd and Cr are constant for different lengths L. In general, the propagation delay of an interconnect circuit such as that of FIG. 2 can be expressed as:

$$Tpd = f1(Rd)*f2(Cr) + f3(Rd)f4(Cint) + f5(Rint)f6(Cr) + f7(Rint)f8(Cint), \quad (eq. 1)$$

where Tpd is the propagation delay, f1 and f3 are functions of driver impedance Rd, f2 and f6 are functions of receiver gate capacitance Cr, f4 and f8 are functions of interconnect capacitance Cint, and f5 and f7 are functions of interconnect resistance Rint. In general, Rint and Cint are proportional to the length of metal interconnects (L). Moreover, the stronger a driver, the smaller will be its impedance Rd.

Because the crossover point P need be identified only approximately, for purposes of the present analysis, Eq. 1 can be approximated as:

$$Tpd = a*Rd*Cr + b*Rd*Cint + c*Rint*Cr + d*Rint*Cint, \quad (eq. 2)$$

where a, b, c, and d are constants. This equation contains a term that is constant in L, first order terms in L for Rint and Cint (b*Rd*Cint and c*Rint*Cr), and a quadratic term in L (d*Rint*Cint). It can be seen that for very small lengths L, the constant term dominates the propagation delay. As the interconnect length L increases, the linear terms (b*Rd*Cint or c*Rint*Cr) dominate, and at some point the quadratic term (d*Rint*Cint) becomes dominant. As one way of approximating the cross-over point, in can be shown that it occurs roughly at the same length L at which the quadratic term of eq. 2 begins to dominate. Thus the crossover point can be approximated as the length L at which the quadratic term equals the linear term, i.e., under the following condition:

$$b*Rd*Cint + c*Rint*Cr = d*Rint*Cint, \text{ or} \quad (eq. 3)$$

$$(b/d)(Rd/Rint) + (c/d)(Cr/Cint) = 1. \quad (eq. 4)$$

This is the interconnect length at which the signal propagation delay for the interconnect begins to be dominated more by the Rint*Cint term than by the Cint term and Rint term in eq. 2.

Eq. 4 depends on the ratio of Rint to Rd and Cint to Cr. For an interconnect dominated delay path, Cr/Cint is relatively small and can be ignored (that is, in eq. 3, the term c*Rint*Cr is relatively small and can be ignored). It follows that $$Rint = k*Rd, \quad (eq. 5)$$

where k=b/d. The value of k can be determined through circuit simulations, or in an embodiment, can be set to k=1 by default. The value of Rd can be determined by circuit simulations and stored in a database for each driver type in the circuit design, or it can be derived from the rate of driver delay versus the output capacitance.

Given the above background, a timing analysis method can now be constructed for calculating best- and worst-case propagation delay values without relying on inaccurate assumptions such as that the largest-capacitance case always corresponds to the worst-case propagation delay and that the smallest-capacitance case always corresponds to the best-case propagation delay. In the method, each interconnect is considered individually. It is first determined whether its length places it in Regime II or Regime III (and optionally in Regime I). If it is in Regime III then the smallest-capacitance case is used to extract parameters from the layout for use in calculating the worst-case propagation delay, and the largest-capacitance case is used to extract parameters from the layout for use in calculating the best-case propagation delay. If it is in Regime II, then the opposite is used. If it is in Regime I, then either capacitance case can be used.

Figure 4:
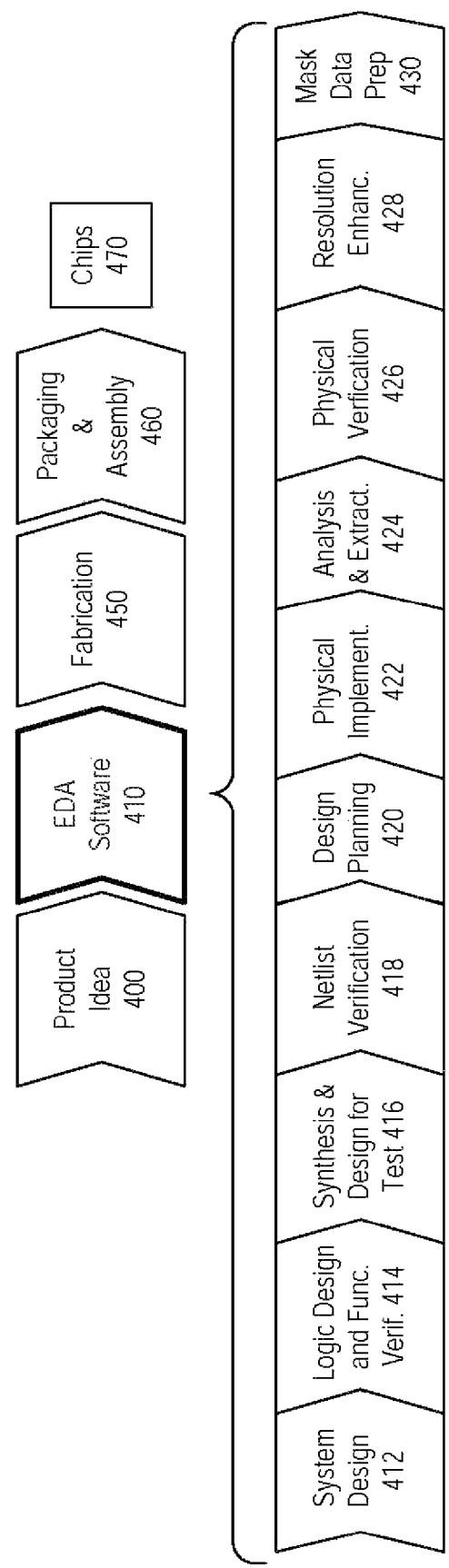
FIGS. 4 and 5 are flow charts of an illustrative digital integrated circuit design flow incorporating the invention.

FIG. 4 shows a simplified representation of an illustrative digital integrated circuit design flow. At a high level, the process starts with the product idea (step 400) and is realized in an EDA (Electronic Design Automation) software design process (step 410). When the design is finalized, the fabrication process (step 450) and packaging and assembly processes (step 460) occur resulting, ultimately, in finished integrated circuit chips (result 470).

The EDA software design process (step 410) is actually composed of a number of steps 412 430, shown in linear fashion for simplicity. In an actual integrated circuit design process, the particular design might have to go back through steps until certain tests are passed. Similarly, in any actual design process, these steps may occur in different orders and combinations. This description is therefore provided by way of context and general explanation rather than as a specific, or recommended, design flow for a particular integrated circuit.

A brief description of the components steps of the EDA software design process (step 410) will now be provided.

System design (step 412): The designers describe the functionality that they want to implement, they can perform what if planning to refine functionality, check costs, etc. Hardware-software architecture partitioning can occur at this stage.

Example EDA software products from Synopsys, Inc. that can be used at this step include Model Architect, Saber, System Studio, and DesignWare® products.

Logic design and functional verification (step 414): At this stage, the VHDL or Verilog code for modules in the system is written and the design is checked for functional accuracy. More specifically, the design is checked to ensure that produces the correct outputs in response to particular input stimuli. Example EDA software products from Synopsys, Inc. that can be used at this step include VCS, VERA, DesignWare®, Magellan, Formality, ESP and LEDA products.

Synthesis and design for test (step 416): Here, the VHDL/Verilog is translated to a netlist. The netlist can be optimized for the target technology. Additionally, the design and implementation of tests to permit checking of the finished chip occurs. Example EDA software products from Synopsys, Inc. that can be used at this step include Design Compile r, Physical Compiler, Test Compiler, Power Compiler, FPGA Compiler, Tetramax, and DesignWare® products.

Netlist verification (step 418): At this step, the netlist is checked for compliance with timing constraints and for correspondence with the VHDL/Verilog source code. Example EDA software products from Synopsys, Inc. that can be used at this step include Formality, PrimeTime, and VCS products.

Design planning (step 420): Here, an overall floor plan for the chip is constructed and analyzed for timing and top level routing. Example EDA software products from Synopsys, Inc. that can be used at this step include Astro and IC Compiler products.

Physical implementation (step 422): The placement (positioning of circuit elements) and routing (connection of the same) occurs at this step. Example EDA software products from Synopsys, Inc. that can be used at this step include the Astro and IC Compiler products.

Analysis and extraction (step 424): At this step, the circuit function is verified at a transistor level, this in turn permits what if refinement. Layout geometries and the parasitic RC netlist also can be extracted at this step, for various process corner cases. Example EDA software products from Synopsys, Inc. that can be used at this step include AstroRail, PrimeRail, Primetime, and Star RCXT products. Certain aspects of the invention can be applied during this step.

Physical verification (step 426): At this step various checking functions are performed to ensure correctness for: manufacturing, electrical issues, lithographic issues, and circuitry. Example EDA software products from Synopsys, Inc. that can be used at this step include the Hercules product. Certain aspects of the invention can be take place during this step as well.

Resolution enhancement (step 428): This step involves geometric manipulations of the layout to improve manufacturability of the design. Example EDA software products from Synopsys, Inc. that can be used at this step include Proteus, ProteusAF, and PSMGen products.

Mask data preparation (step 430): This step provides the data for production of masks for lithographic use to produce finished chips. Example EDA software products from Synopsys, Inc. that can be used at this step include the CATS(R) family of products.

Figure 5:
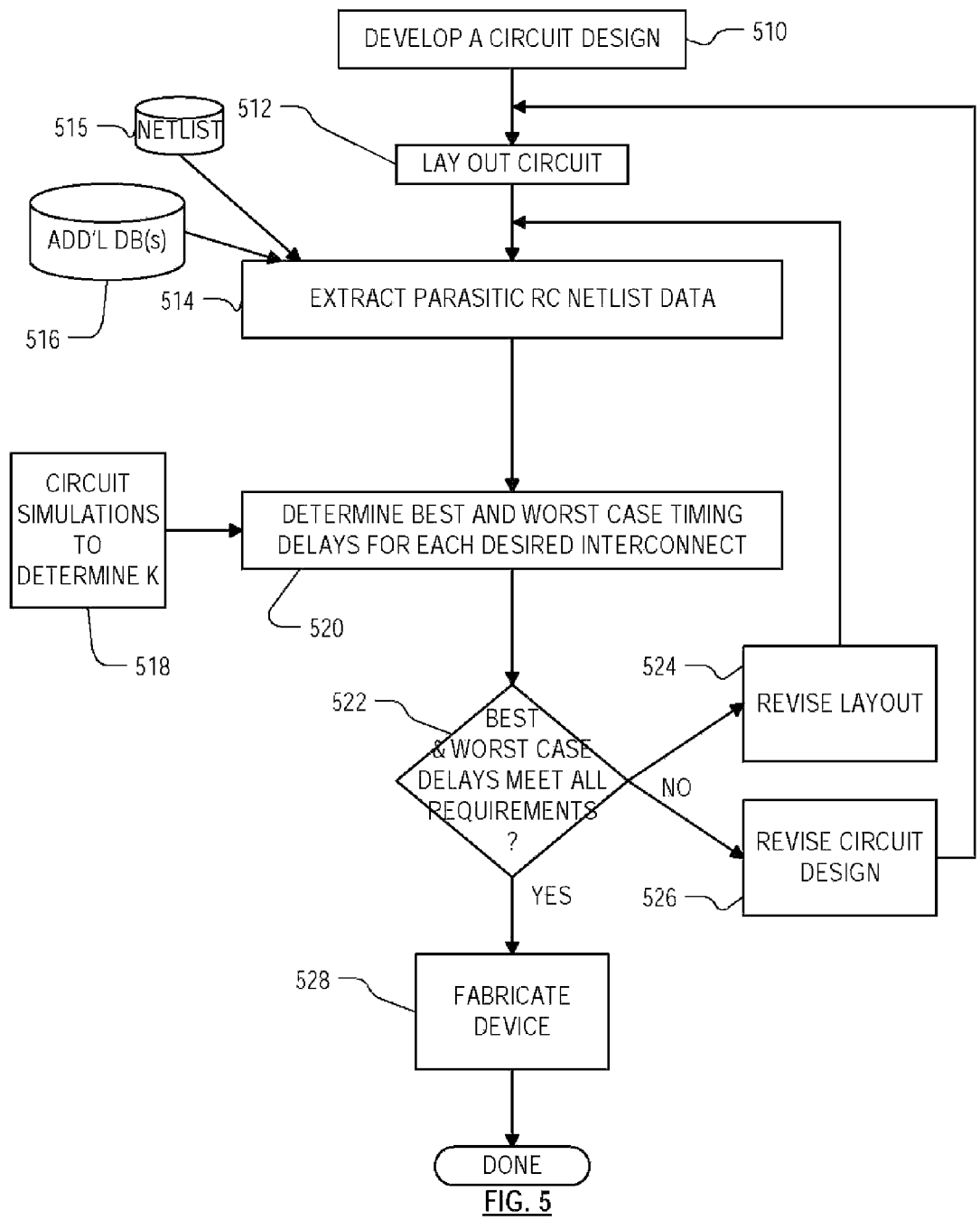

FIG. 5 is another flow chart of the example method, focusing more closely on steps that include aspects of the invention. As with all flowcharts herein, it will be appreciated that many of the steps can be combined, performed in parallel or pipelined or performed in a different sequence without affecting the functions achieved. In some cases a re-arrangement of steps will achieve the same results only if certain other changes are made as well, and in other cases a re-arrangement of steps will achieve the same results only if certain conditions are satisfied.

In step 510, a circuit design is developed. As used herein, a "circuit design" is a gate level design, after synthesis from VHDL or equivalent and before layout. Typically a design is represented in a file or database of some kind, and includes a "netlist", which is a listing of all the devices used in the circuit design and the interconnects among them. In step 512, the circuit design is laid out into a layout. It will be understood that the layout need not be of a complete circuit design, for example if only a portion of the circuit is to be simulated at this time. The layout is typically represented in another standard format file or database, for example using the standard GDSII format. Among other things, the layout file specifies geometries (2-dimensional shape, size, location and orientation) of various elements (including interconnect elements) on various layers of a chip design. The geometries specified in the layout file are considered to be nominal geometries, since various process conditions can vary them.

In step 514, parasitic RC netlist data is extracted from the layout data, for at least the particular interconnects selected for analysis. The step also takes input from the netlist database 515, as well as from one or more additional databases 516, which include such information as the resistance per unit length for interconnects in each layer of interest, and the capacitance per unit length for interconnects in each layer of interest. For Rd and Cr, normally each cell or gate is pre-characterized, and Rd and Cr either can be stored separately, or extracted from a timing library database by tools like Primetime.

In step 518, of value for the constant k can be determined. Either a default value such as k=1 can be used, or circuit simulations can be used to determine a value for k. Alternatively, other methods may be used to derive a value for k. Preferably a single value of k is used for the entire analysis, although in a different embodiment, different values for k might be used for different layout topologies (such as branching configurations), for different regions of the layout, or for different process technologies. In a preferred embodiment, k is constant for the entire analysis and is established prior to the step 512 of laying out the circuit.

At this point in the process, if desired, some or all of the interconnects of interest can be segmented for separate analysis as described hereinafter. Then, in step 520, the best and worst case timing delays for each desired interconnect are determined. Preferably both are determined at this stage, but in another embodiment only the best case timing delays are determined, and in yet another embodiment only the worst case timing delays are determined in this step. In one embodiment, the output of step 520, which can be written to a "back-annotation database" in the system's storage subsystem, can be considered to be the output of the overall process. In another embodiment, however, the process continues to step 522, where it is determined whether the best and/or worst case timing delays meet all the specifications of the design. In one embodiment the maximum propagation delay determined in step 524 each interconnect of interest is compared to the "worst case" timing specification for that interconnect, in order to determine a "slack". The slack must be positive to meet specification, and it must be sufficiently positive to allow for random or other variations in conditions which have not yet been taken into account. An overall "slack" can then be determined which is the minimum of all the individual slacks, and this too must be sufficiently greater than zero to allow for variations in conditions which have not yet been taken into account.

It will be appreciated that in an embodiment, the steps of FIG. 5 can be pipelined so that the step of testing the best and worst case propagation delays can be performed immediately after the calculation of the best and worst case propagation delay of each interconnect individually, or after the propagation delays are calculated for certain groups of the interconnects, and the analysis can be aborted early if one or more of the timing delays calculated do not meet specifications. In this case the "plurality" of interconnects studied effectively will be smaller than originally planned.

If in step 522 the best and worst case timing delays do not meet all requirements, then either the layout can be revised (step 524) or the circuit design itself can be revised (step 526). If the layout is revised (step 524), then the process returns to step 514 for again extracting the parasitic RC netlist data for new simulations. If the circuit design itself is revised (step 526) then the procedure returns to step 512 for laying out the circuit design, or revised portion thereof, again. On the other hand, if in step 522 it is determined that the best and worst case propagation delays calculated in step 520 do meet all requirements, then in an embodiment, that determination can be considered to constitute an output of the overall process. Preferably this output is used to authorize fabrication of an actual device (step 528) from the layout, and the output of the process is the actual device.

Figure 6:
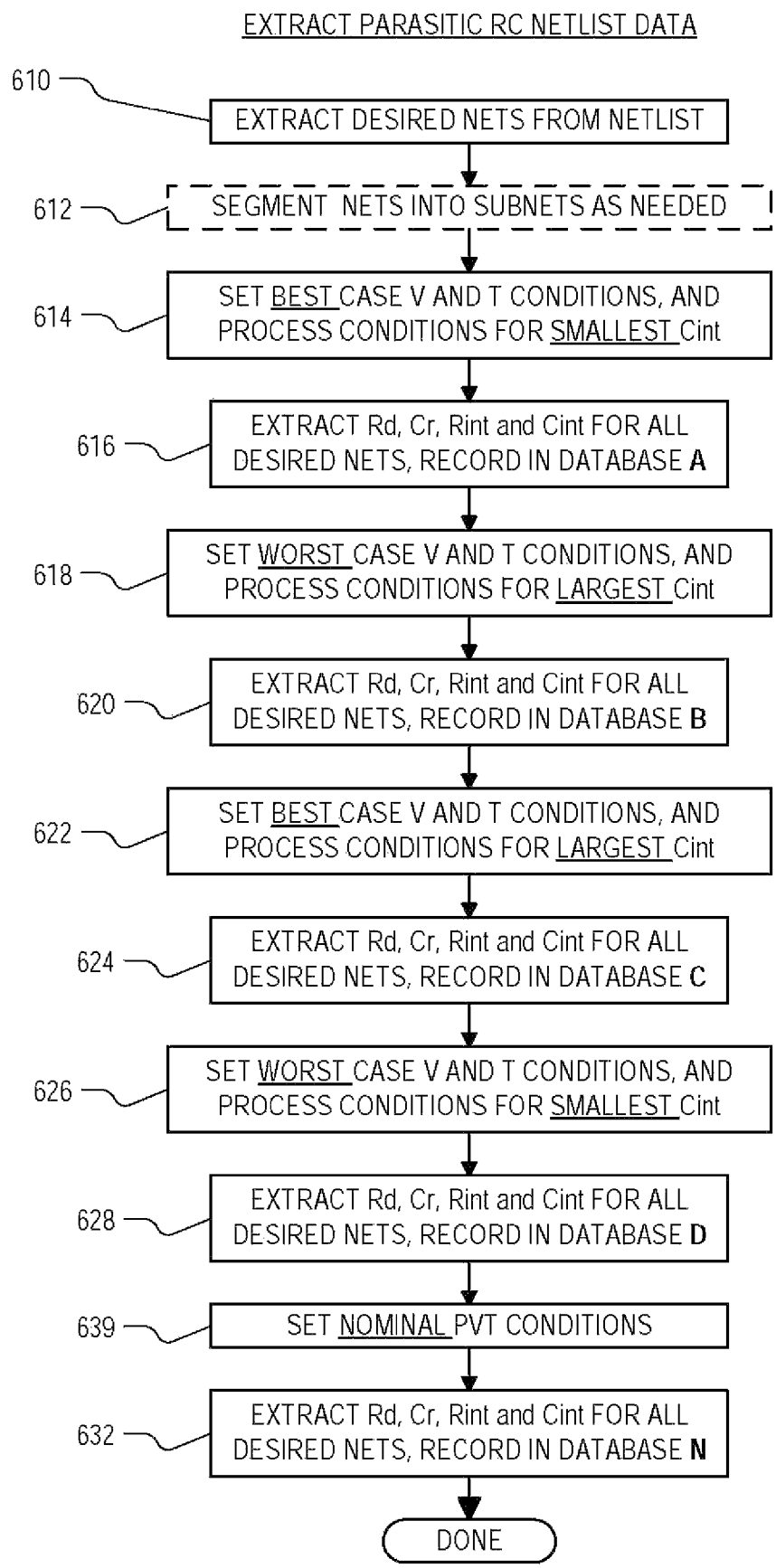
FIG. 6 is a flowchart detail of the step in FIG. 5 for extracting parasitic RC netlist data.

FIG. 6 is a flowchart detail of the step 514 in FIG. 5 for extracting parasitic RC netlist data. In step 610, the system extracts the desired nets or interconnects from the netlist database. As used herein, the term "net" is used interchangeably with the term "interconnect", to refer to the signal path from a source node to a destination node. The plurality of interconnects that are analyzed in the present method is based on the plurality of interconnects extracted from the netlist database 515, but in a particular execution of the method they might not include all such interconnects. For example, the operator might decide for a particular embodiment to analyze the propagation delays of only the clock distribution trees, or only the interconnects in a particular region of the layout, or only the interconnects that are part of a critical path in the circuit. Also in a particular embodiment, some of the interconnects from the netlist might be segmented into two or more interconnects for purposes of the timing analysis. This might be desirable for example if it is believed that propagation delay characteristics should be treated separately on different segments of the metal line. Thus the term "node", which as mentioned above is considered to define the beginning and end of an "interconnect", is not limited to junctions between an interconnect line and a device terminal. As used herein, the term could also include, for example the point where a metal line on one layer meets a via for carrying the signal to another layer, or a point where a metal line branches out to two or more further metal lines in the same layer. As yet another example, a "node" might even be a point where a metal line in a single layer makes a turn, such as in a fabrication process where lines oriented in two different directions might have different resistance or capacitance characteristics. When segmented, each segment of an interconnect is sometimes referred to herein as "subnet", which itself is still considered to constitute a net or interconnect.

Figure 7:
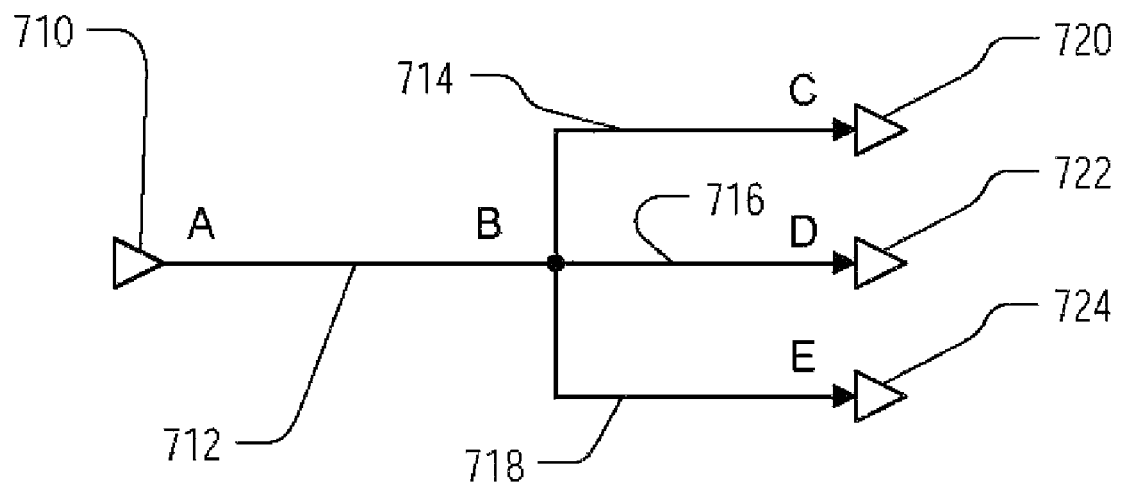
FIG. 7 illustrates an example of a segmentation.

In step 612, if desired, some or all of the interconnects obtained in step 610 can be segmented into subnets, each of which is now itself considered a net or interconnect. FIG. 7 illustrates an example of a segmentation. In the example of FIG. 7, a driver 710 has an output at node A. A metal line 712 extends from node A to node B, at which point it splits off into three additional segments: a segment 714 which extends from node B to node C, segment 716 which extends from node B to node D, and a segment 718 which extends from node B to node E. Nodes C, D and E are inputs to respective receivers 720, 722 and 724. Without segmentation, each of the following interconnects are analyzed separately: AC, AD and AE. With segmentation, the following interconnects are analyzed separately: AB, BC, BD, BE. Hybrid segmentation examples can also be used, for example using the segmented approach for the path from node A to node C, but a continuous approach for the paths from node A to node D and from node A to node E.

Returning to FIG. 6, four databases are now extracted to provide the parameter values required to calculate the interconnect propagation delay given for different corner cases: the best case voltage and temperature conditions and the best case (smallest) interconnect capacitance, the best case voltage and temperature conditions and the worst-case (largest) interconnect capacitance, the worst case voltage and temperature conditions and the best case (smallest) interconnect capacitance, and the worst case voltage and temperature conditions and the worst-case (largest) interconnect capacitance. The smallest and largest interconnect capacitance cases are preferably predetermined, for example in accordance with statistical modeling of the range of likely process variations. Even in an embodiment in which no "smallest" and "largest" capacitance variations are predetermined, at a minimum they are chosen so that in the "smallest" capacitance variation the interconnect exhibits smaller capacitance than it does the "largest" capacitance case. As previously explained, each interconnect will also have an interconnect resistance dictated by the particular process variation, and this resistance might be larger in the "smallest" capacitance variation than in the "largest" capacitance variation, or it might be smaller.

The required parameter values are the driver output resistance Rd at the source node of the interconnect, the receiver capacitance Cr at the destination node of the interconnect, the resistance Rint of the interconnect segment, and the capacitance Cint of the interconnect segment. This information can be extracted for each of the interconnects being analyzed, based on the geometry of the interconnect as provided in the layout database, and layer information and device circuit parameter information in the additional databases 516. Existing products can be used to extract this information, for example Star RCXT to provide Rint and Cint, and PrimeTime to provide Rd and Cr based on timing libraries.

Thus in step 614, the best case voltage and temperature conditions are established first, as well as the process conditions for the smallest interconnect capacitance (see FIG. 1C). With these assumptions, in step 616, values are extracted for Rd, Cr, Rint and Cint for all desired nets. The complete set of values is stored in a database referred to herein as database A. As used herein, the term "database" does not necessarily imply any unity of structure. For example, two or more separate databases, when considered together, still constitute a "database" as that term is used herein. Next, in step 618, the worst case voltage and temperature conditions are established, as well as the process conditions for the largest interconnect capacitance (see FIG. 1B). With these assumptions, in step 620, values are extracted for Rd, Cr, Rint and Cint for all desired nets. The complete set of values is stored in a database referred to herein as database B. In step 622, the best case voltage and temperature conditions are established, as well as the process conditions for the largest interconnect capacitance. With these assumptions, in step 624, values are extracted for Rd, Cr, Rint and Cint for all desired nets. The complete set of values is stored in a database referred to herein as database C. In step 626, the worst case voltage and temperature conditions are established, as well as the process conditions for the smallest interconnect capacitance. With these assumptions, in step 628, values are extracted for Rd, Cr, Rint and Cint for all desired nets. The complete set of values is stored in a database referred to herein as database D.

If desired, a fifth database N can also be created, using nominal case conditions for voltage, temperature and process (i.e. the capacitance case of FIG. 1A). The fifth database is used for determining the regime under which the propagation delay for a particular interconnect should be analyzed. But since the transition point between regimes need not be known exactly, as previously explained, and assuming the best and worst capacitance cases do not deviate too much from the nominal, in one embodiment creation of the fifth database can be omitted and any of the first four can be used instead. It will also be appreciated that whereas in the embodiment of FIGS. 5 and 6 all the databases are created before any of the propagation delays are calculated in step 520 (FIG. 5), in another embodiment the creation of the databases can be omitted and the required parameter values can be extracted using the Star RCXT and PrimeTime products only as needed. Hybrid variations of these two strategies are also possible.

Figure 8:
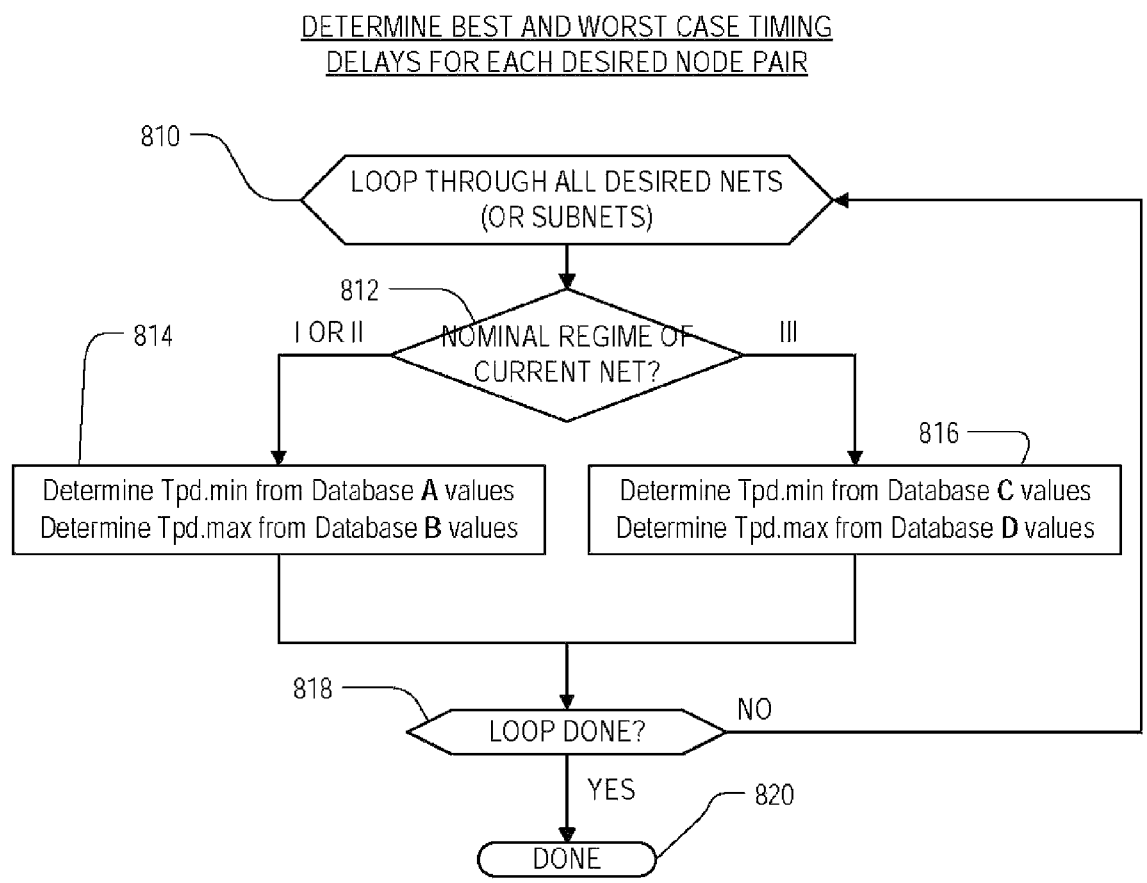
FIG. 8 is a flowchart detail of the step in FIG. 5 for determining the best and worst case timing delays for each desired interconnect.

FIG. 8 is a flowchart detail of the step 520 in FIG. 5 for determining the best and worst case timing delays for each desired interconnect. In a step 810, the system begins a loop through all of the nets for which timing data is desired. In step 812, the system makes a determination of whether the propagation delay for the current net should be analyzed in regime III or in regime I or II. As previously mentioned, for very short interconnects (regime I) it makes little difference whether the propagation delay is analyzed using the best or worst case capacitance conditions. Therefore, for convenience, in FIG. 8, interconnects that are in regime I are analyzed the same as if they were in regime II. Another embodiment can take the opposite convention and analyze them as if they were in regime III, or can analyze them using an assumption of nominal conditions, all with little difference in results.

Referring to FIG. 3, it can be seen that in regime II, the smallest interconnect capacitance case yields the smallest propagation delay and the largest interconnect capacitance case yields a largest interconnect delay. Thus in step 814, where it has been determined that the interconnect should be analyzed under regime I or regime II, the minimum propagation delay value for the interconnect is calculated using the values from database A and the maximum propagation delay value for the interconnect is calculated using the values from database B. Referring again to FIG. 3, it can be seen that in regime III, the largest interconnect capacitance case yields the smallest propagation delay and the smallest interconnect capacitance case yields a largest interconnect delay. Thus in step 816, where it has been determined that the interconnection be analyzed under regime III, the minimum propagation delay value for the interconnect is calculated using the values from database C and the maximum propagation delay value for the interconnect is calculated using values from database D. These choices and conditions are summarized in Table I below.

TABLE I

| Regime | Tpd of interest | V&T case | Cint case | Database |
| --- | --- | --- | --- | --- |
| II | Tpd.min | best | smallest | A |
| (Rint < k * Rd) | Tpd.max | worst | largest | B |
| III | Tpd.min | best | largest | C |
| (Rint > k * Rd) | Tpd.max | worst | smallest | D |

In step 818, after the minimum and maximum propagation delay values have been calculated in either step 814 or 816, it is determined whether there are any more interconnects to be analyzed. If so then the routine returns to step 810 to analyze the next interconnect. If not, then the flowchart of FIG. 8 is done (step 820).

Figure 9:
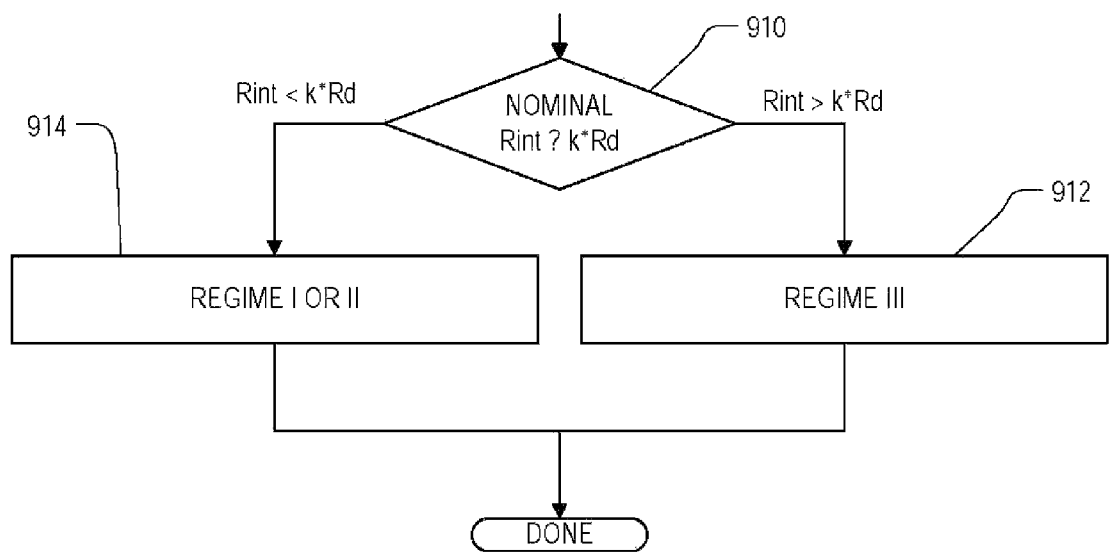
FIG. 9 is a flowchart detail of the step in FIG. 8 for making a determination of which regime under which the current net will be analyzed.

FIG. 9 is a flowchart detail of the step 812, for making a determination of which regime under which the current net will be analyzed. As previously mentioned, only an approximate determination is required here because for nets that are close to the crossover point, analysis under either regime will yield approximately the same minimum and maximum propagation delay values. As used herein, an "estimate" or "approximation", when applied to a value, includes exactness as a special case. That is, a value is still considered to be an estimate or approximation, even if it turns out to be exactly correct. Similarly, an "approximate determination" is a determination made using only approximate values, or made using a decision mechanism which only approximates one which always produces the correct result. In other words, an "approximate determination" can be correct or incorrect for a particular interconnect, but if incorrect, and the resulting calculated propagation delays will still be sufficiently close for the purposes of the particular analysis.

Accordingly, in FIG. 9, the determination of the regime under which a particular interconnect should be analyzed, is made using the approximate formula derived above. In particular, in step 910, the resistance Rint of the current interconnect is compared to k times the output resistance Rd of the source node driver of the current interconnect. If Rint>k*Rd, then the current interconnect is considered to be best analyzed under regime III (step 912). If Rint<k*Rd, then the current interconnect is considered to be best analyzed under regime I or II (step 914). If Rint=k*Rd, then analysis under any of the regimes and should be sufficient. The comparison of Rint to k*Rd is one approximation that can be used in step 910, and is preferred because of its extremely low-cost and relative accuracy. Other approximations can be used in other embodiments. Additionally, as previously mentioned, the values of Rint and Rd used in this comparison are preferably the nominal values for the current interconnect, taken from database N, but in another embodiment values can be taken from any of the other databases A-D.

Figure 10:
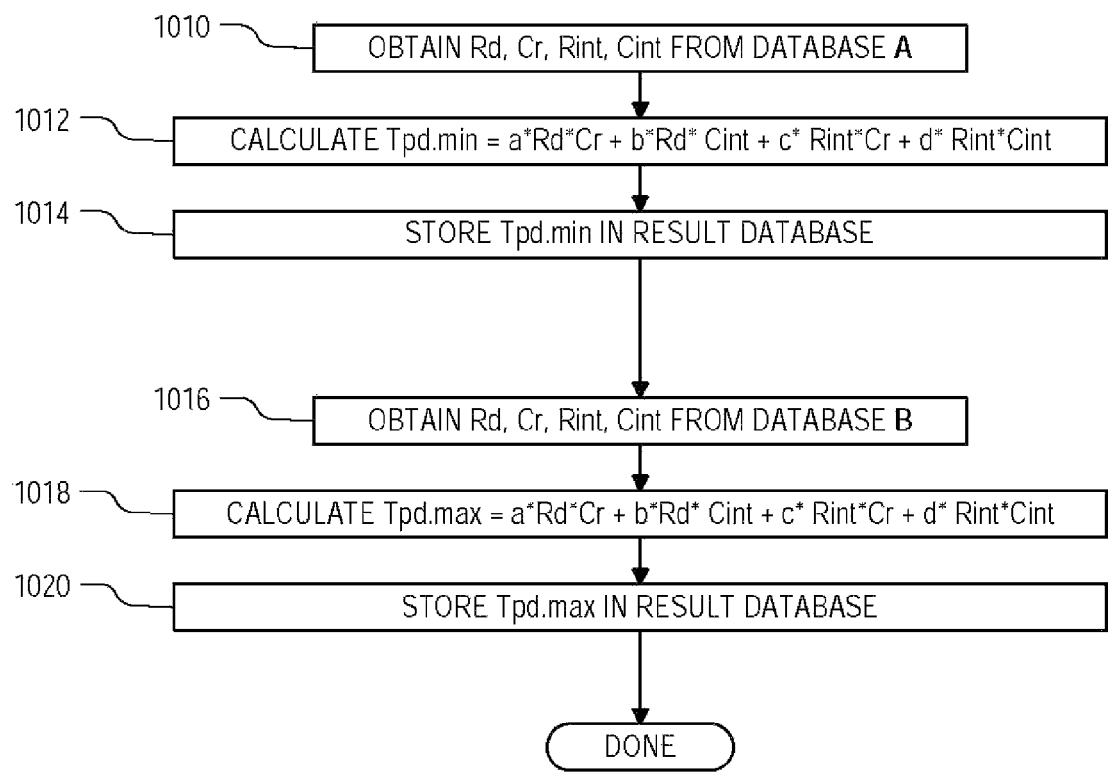
FIG. 10 is a flowchart detail of step in FIG. 8 for determining the minimum and maximum propagation delay values from databases A and B, respectively.

FIG. 10 is a flowchart detail of step 814 (FIG. 8) for determining the minimum and maximum propagation delay values from databases A and B, respectively. In step 1010, values for Rd, Cr, Rint and Cint are obtained for the current interconnect from database A. In step 1012, the minimum propagation delay value Tpd.min for the particular interconnect is calculated using a formula such as that set forth above as eq. 2. A more or less precise formula can be used in a different embodiment. In step 1014, the calculated value of Tpd.min is stored in a result database in association with the current interconnect. In step 1016 values for Rd, Cr, Rint and Cint are obtained for the current interconnect from database B. In step 1018 the maximum propagation delay value Tpd.max for the particular interconnect is calculated for example using the same eq. 2 formula as above. In step 1020 the calculated value of Tpd.max is stored in the result database in association with the current interconnect.

Figure 11:
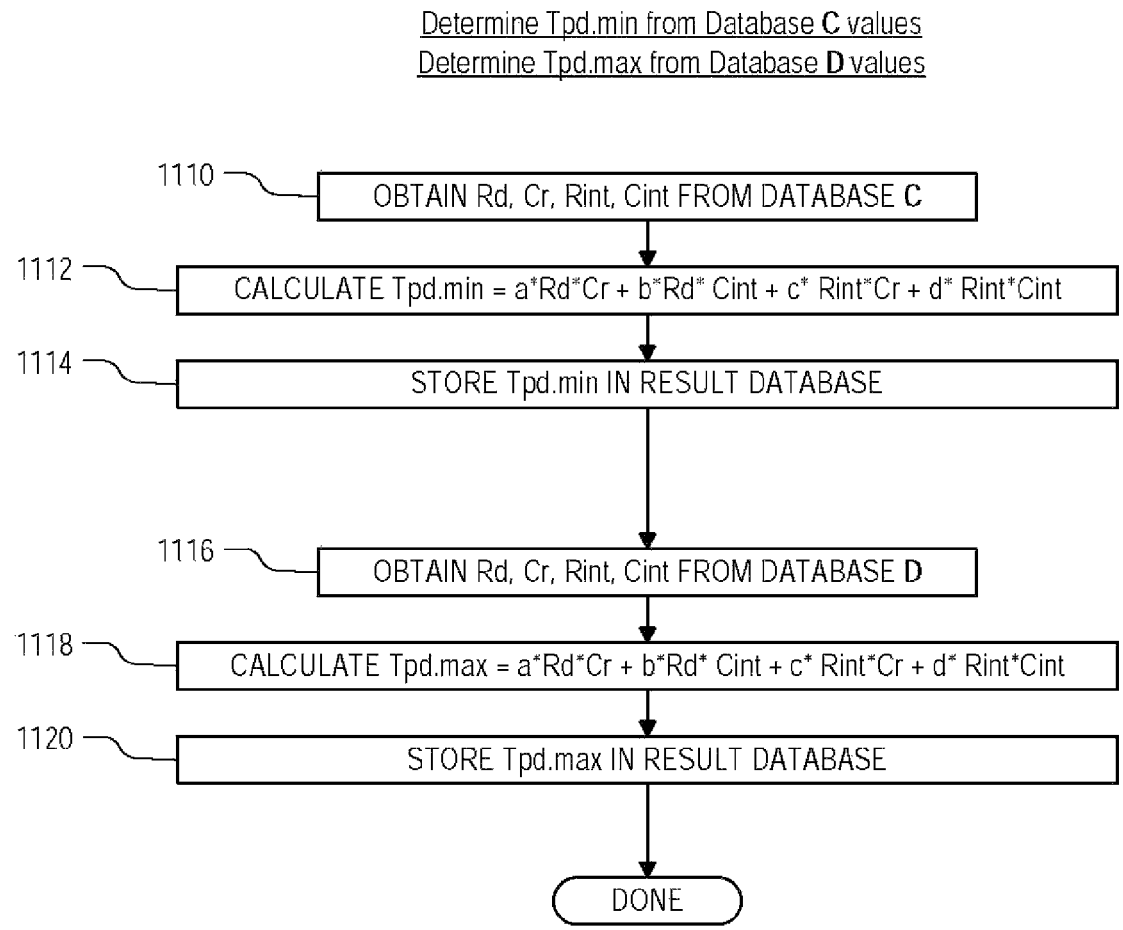
FIG. 11 is a flowchart detail of step in FIG. 8 for determining the minimum and maximum propagation delay values from databases C and D, respectively.

Similarly, FIG. 11 is a flowchart detail of step 816 (FIG. 8) for determining the minimum and maximum propagation delay values from databases C and D, respectively. In step 1110, values for Rd, Cr, Rint and Cint are obtained for the current interconnect from database C. In step 1112, the minimum propagation delay value Tpd.min for the particular interconnect is calculated using a formula such as that set forth above as eq. 2. Again, a more or less precise formula can be used in a different embodiment. In step 1114, the calculated value of Tpd.min is stored in a result database in association with the current interconnect. In step 1116 values for Rd, Cr, Rint and Cint are obtained for the current interconnect from database D. In step 1118 the maximum propagation delay value Tpd.max for the particular interconnect is calculated for example using the same formula as above. In step 1120 the calculated value of Tpd.max is stored in the result database in association with the current interconnect.

Figure 12:
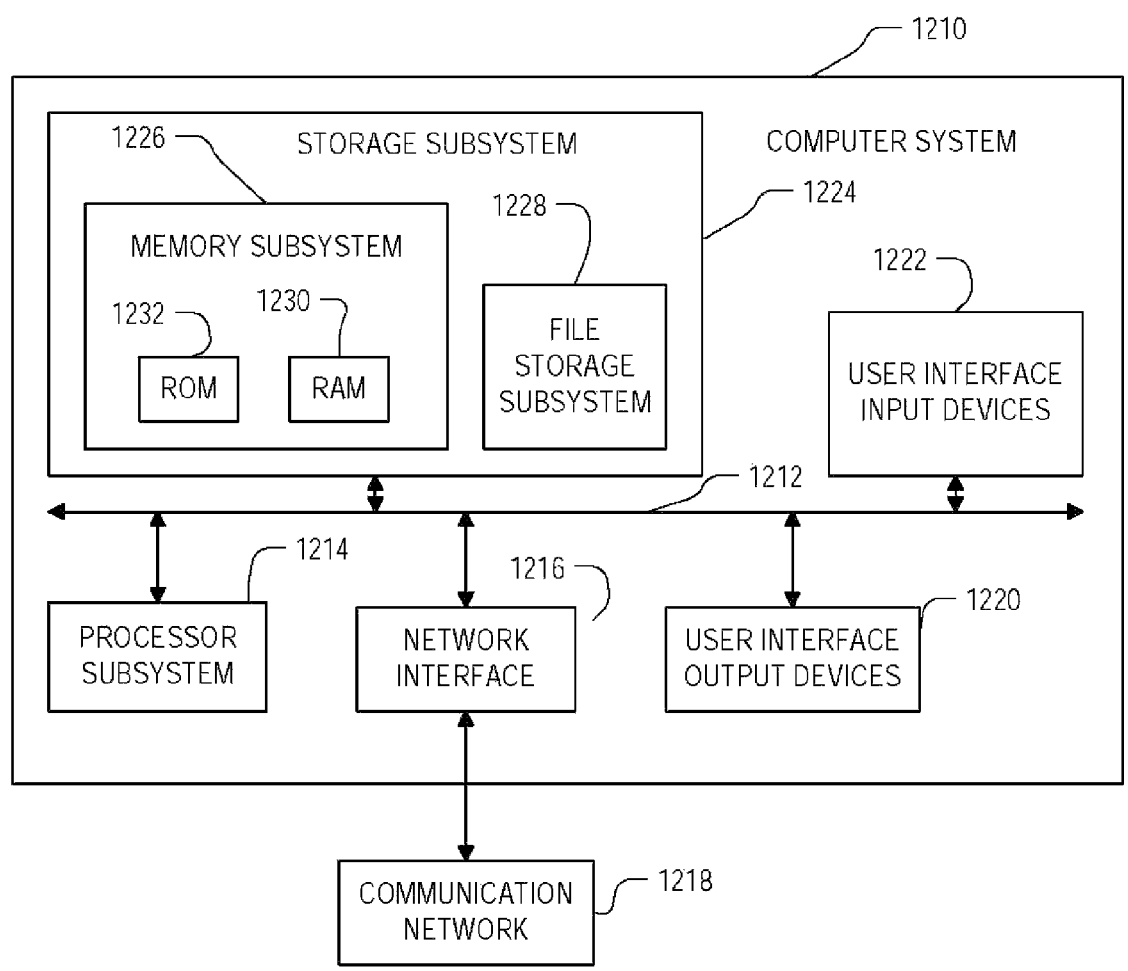
FIG. 12 is a simplified block diagram of a computer system implementing software incorporating aspects of the present invention.

FIG. 12 is a simplified block diagram of a computer system 1210 that can be used to implement software incorporating aspects of the present invention. Computer system 1210 typically includes a processor subsystem 1214 which communicates with a number of peripheral devices via bus subsystem 1212. These peripheral devices may include a storage subsystem 1224, comprising a memory subsystem 1226 and a file storage subsystem 1228, user interface input devices 1222, user interface output devices 1220, and a network interface subsystem 1216. The input and output devices allow user interaction with computer system 1210. Network interface subsystem 1216 provides an interface to outside networks, including an interface to communication network 1218, and is coupled via communication network 1218 to corresponding interface devices in other computer systems. Communication network 1218 may comprise many interconnected computer systems and communication links. These communication links may be wireline links, optical links, wireless links, or any other mechanisms for communication of information. While in one embodiment, communication network 1218 is the Internet, in other embodiments, communication network 1218 may be any suitable computer network.

User interface input devices 1222 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 1210 or onto computer network 1218.

User interface output devices 1220 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 1210 to the user or to another machine or computer system.

Storage subsystem 1224 stores the basic programming and data constructs that provide the functionality of certain embodiments of the present invention. For example, the various modules implementing the functionality of certain embodiments of the invention may be stored in storage subsystem 1224. These software modules are generally executed by processor subsystem 1214.

Memory subsystem 1226 typically includes a number of memories including a main random access memory (RAM) 1230 for storage of instructions and data during program execution and a read only memory (ROM) 1232 in which fixed instructions are stored. File storage subsystem 1228 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystem 1228. The host memory 1226 contains, among other things, computer instructions which, when executed by the processor subsystem 1214, cause the computer system to operate or perform functions as described herein. As used herein, processes and software that are said to run in or on "the host" or "the computer", execute on the processor subsystem 1214 in response to computer instructions and data in the host memory subsystem 1226 including any other local or remote storage for such instructions and data.

Bus subsystem 1212 provides a mechanism for letting the various components and subsystems of computer system 1210 communicate with each other as intended. Although bus subsystem 1212 is shown schematically as a single bus, alternative embodiments of the bus subsystem may use multiple busses.

Computer system 1210 itself can be of varying types including a personal computer, a portable computer, a workstation, a computer terminal, a network computer, a television, a mainframe, or any other data processing system or user device. Due to the ever-changing nature of computers and networks, the description of computer system 1210 depicted in FIG. 12 is intended only as a specific example for purposes of illustrating the preferred embodiments of the present invention. Many other configurations of computer system 1210 are possible having more or less components than the computer system depicted in FIG. 12.

In one embodiment, the circuit design, netlist 515, additional databases 516, and/or layout data can be input from data stored in the storage subsystem 1224. In other embodiments one or more of these can be input via the user interface input devices 1222, for example in the form of a data stream. Similarly, in one embodiment, the output or outputs of the methods described herein can be written into the storage subsystem 1224, or output via the user interface output devices 1220, or both.

It will be understood that the present invention may be practiced as a method or device adapted to practice the method. The invention also may be viewed as a system which incorporates mechanisms such as software instructions which, when applied to a processing subsystem, perform the methods described herein. The invention may also be viewed as an article of manufacture such as media impressed with logic to carry out the methods described herein.

As used herein, a given signal, event or value is "responsive" to a predecessor signal, event or value if the predecessor signal, event or value influenced the given signal, event or value. If there is an intervening processing element, step or time period, the given signal, event or value can still be "responsive" to the predecessor signal, event or value. If the intervening processing element or step combines more than one signal, event or value, the signal output of the processing element or step is considered "responsive" to each of the signal, event or value inputs. If the given signal, event or value is the same as the predecessor signal, event or value, this is merely a degenerate case in which the given signal, event or value is still considered to be "responsive" to the predecessor signal, event or value. "Dependency" of a given signal, event or value upon another signal, event or value is defined similarly.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were cho-

We claim as follows:

1. A computer implemented circuit simulation method, comprising the steps of:
    inputting layout data representing a layout of at least a part of a circuit design, the circuit design including a plurality of interconnects;
    estimating, using a computer, a particular signal propagation delay value for each of the interconnects in the plurality, the particular signal propagation delay value being, for all of the interconnects in the plurality, a member of the group consisting of a minimum propagation delay value being a propagation delay value determined for assumed best-case propagation conditions, and a maximum signal propagation delay value being a propagation delay value determined for assumed worst-case propagation conditions; and
    outputting the estimated signal propagation delay values,
    wherein the step of estimating a particular signal propagation delay value, for each particular one of the interconnects in the plurality, comprises the steps of:
    making a particular approximate determination of whether or not a signal propagation delay time for the particular interconnect is dominated more by an interconnect capacitance than by a product of the interconnect capacitance and an interconnect resistance; and
    estimating the particular signal propagation delay value for the particular interconnect in dependence upon the step of making a particular approximate determination.

2. A method according to claim 1, wherein the particular signal propagation delay value, for all of the interconnects in the plurality, is the maximum signal propagation delay value Tpd.max.

3. A method according to claim 2, further comprising the step of estimating a minimum signal propagation delay value for each of the interconnects in the plurality,
    wherein the step of estimating a minimum signal propagation delay value, for each particular one of the interconnects in the plurality, comprises the step of estimating the minimum signal propagation delay value for the particular interconnect in dependence upon the step of making an approximate determination.

4. A method according to claim 1, wherein the layout data includes nominal geometry for the particular interconnect, and wherein the step of making a particular approximate determination comprises the step of comparing a term depending on the interconnect capacitance to a term depending on the product of the interconnect capacitance and the interconnect resistance, assuming the nominal geometry for the particular interconnect.

5. A method according to claim 1, wherein the particular interconnect has a source node driven by a source node driver having an equivalent output resistance, and wherein the step of making a particular approximate determination, comprises the step of making an approximate determination of whether or not the resistance of the particular interconnect exceeds a number k times the equivalent output resistance of the source node driver, where k is a predetermined constant.

6. A method according to claim 5, wherein k is constant for all occurrences of the step of making a particular approximate determination, in the step of estimating a particular signal propagation delay value for each of the interconnects in the plurality.

7. A method according to claim 1, wherein the particular signal propagation delay value, for all of the interconnects in the plurality, is the maximum signal propagation delay value Tpd.max,
    and wherein the step of estimating the particular signal propagation delay value for the particular interconnect in dependence upon the step of making a particular approximate determination, comprises the steps of:
    estimating Tpd.max using parameter values determined assuming a predetermined first process variation case, if the step of making a particular approximate determination determines that the signal propagation delay time for the particular interconnect is dominated more by the interconnect capacitance than by the product of the interconnect capacitance and the interconnect resistance; and
    estimating Tpd.max using parameter values determined assuming a predetermined second process variation case if the step of making a particular approximate determination determines that the signal propagation delay time for the particular interconnect is not dominated more by the interconnect capacitance than by the product of the interconnect capacitance and the interconnect resistance,
    wherein the capacitance of the particular interconnect is larger in the first process variation case than in the second process variation case.

8. A method according to claim 7, wherein the first process variation case is a predetermined largest capacitance process variation case and the second process variation case is a predetermined smallest capacitance process variation case.

9. A method according to claim 1, wherein the particular signal propagation delay value, for all of the interconnects in the plurality, is the minimum signal propagation delay value Tpd.min,
    and wherein the step of estimating the particular signal propagation delay value for the particular interconnect in dependence upon the step of making a particular approximate determination, comprises the steps of:
    estimating Tpd.min using parameter values determined assuming a predetermined first process variation case, if the step of making a particular approximate determination determines that the signal propagation delay time for the particular interconnect is dominated more by the interconnect capacitance than by the product of the interconnect capacitance and the interconnect resistance; and
    estimating Tpd.min using parameter values determined assuming a predetermined second process variation case if the step of making a particular approximate determination determines that the signal propagation delay time for the particular interconnect is not dominated more by the interconnect capacitance than by the product of the interconnect capacitance and the interconnect resistance,
    wherein the capacitance of the particular interconnect is smaller in the first process variation case than in the second process variation case.

10. A method according to claim 9, wherein the first process variation case is a predetermined smallest capacitance process variation case and the second process variation case is a predetermined largest capacitance process variation case.

11. A method according to claim 1, further comprising the steps of:
    providing preliminary layout data representing the layout of the at least part of a circuit design; and segmenting at least one interconnect of the preliminary layout data into a plurality of subnets prior to the step of inputting.

12. A method according to claim 1, where the signal propagation delay time for the particular interconnect is dominated more by the interconnect capacitance than by the product of the interconnect capacitance and the interconnect resistance,
wherein the particular interconnect has a source node driven by a source node driver having an equivalent output resistance,
and wherein the step of estimating the particular signal propagation delay value comprises the step of estimating the particular signal propagation delay value for the particular interconnect further in dependence upon a further determination of whether or not the signal propagation delay time for the particular interconnect is dominated more by the equivalent output resistance of the source node driver than by the interconnect capacitance.

13. A method according to claim 12, wherein the signal propagation delay time for the particular interconnect is dominated more by the equivalent output resistance of the source node driver than by the interconnect capacitance,
and wherein the step of estimating the particular signal propagation delay value for the particular interconnect in dependence upon the step of making an approximate determination, comprises the step of estimating the particular signal propagation delay value for the particular interconnect using parameter values determined assuming a predetermined nominal process variation case.

14. A method according to claim 1, further comprising the step of reporting whether or not all of the estimated signal propagation delay values outputted in the step of outputting, satisfy a predetermined timing specification.

15. A method according to claim 1, further comprising the step of fabricating an integrated circuit in accordance with the layout, after the step of estimating the particular signal propagation delay value for each of the interconnects in the plurality.

16. Circuit simulation apparatus, comprising:
means for estimating a particular signal propagation delay value for each of the interconnects in a plurality of interconnects of at least a part of a circuit design represented in layout data, the particular signal propagation delay value being, for all of the interconnects in the plurality, a member of the group consisting of a minimum propagation delay value being a propagation delay value determined for assumed best-case propagation conditions, and a maximum signal propagation delay value being a propagation delay value determined for assumed worst-case propagation conditions, and
means for outputting the estimated signal propagation delay values,
wherein the means for estimating a particular signal propagation delay value, for each particular one of the interconnects in the plurality, comprises:
means for making a particular approximate determination of whether or not a signal propagation delay time for the particular interconnect is dominated more by an interconnect capacitance than by a product of the interconnect capacitance and an interconnect resistance; and
means for estimating the particular signal propagation delay value for the particular interconnect in dependence upon the particular approximate determination made by the means for making a particular approximate determination.

17. Apparatus according to claim 16, wherein the particular signal propagation delay value, for all of the interconnects in the plurality, is the maximum signal propagation delay value Tpd.max.

18. Apparatus according to claim 17, further comprising means for estimating a minimum signal propagation delay value for each of the interconnects in the plurality,
wherein means for estimating a minimum signal propagation delay value, for each particular one of the interconnects in the plurality, comprises means for estimating the minimum signal propagation delay value for the particular interconnect in dependence upon the approximate determination made by the means for making an approximate determination.

19. Apparatus according to claim 16, wherein the layout data includes nominal geometry for the particular interconnect,
and wherein the means for making a particular approximate determination comprises means for comparing a term depending on the interconnect capacitance to a term depending on the product of the interconnect capacitance and the interconnect resistance, assuming the nominal geometry for the particular interconnect.

20. Apparatus according to claim 16, wherein the particular interconnect has a source node driven by a source node driver having an equivalent output resistance,
and wherein the means for making a particular approximate determination, comprises means for making an approximate determination of whether or not the resistance of the particular interconnect exceeds a number k times the equivalent output resistance of the source node driver, where k is a predetermined constant.

21. Apparatus according to claim 20, wherein k is constant for all invocations of the means for making a particular approximate determination, by the means for estimating a particular signal propagation delay value for each of the interconnects in the plurality.

22. Apparatus according to claim 16, wherein the particular signal propagation delay value, for all of the interconnects in the plurality, is the maximum signal propagation delay value Tpd.max,
and wherein the means for estimating the particular signal propagation delay value for the particular interconnect in dependence upon the particular approximate determination, comprises:
means for estimating Tpd.max using parameter values determined assuming a predetermined first process variation case, if the particular approximate determination determined that the signal propagation delay time for the particular interconnect is dominated more by the interconnect capacitance than by the product of the interconnect capacitance and the interconnect resistance; and
and for estimating Tpd.max using parameter values determined assuming a predetermined second process variation case if the particular approximate determination determined that the signal propagation delay time for the particular interconnect is not dominated more by the interconnect capacitance than by the product of the interconnect capacitance and the interconnect resistance,
wherein the capacitance of the particular interconnect is larger in the first process variation case than in the second process variation case.

23. Apparatus according to claim 22, wherein the first process variation case is a predetermined largest capacitance process variation case and the second process variation case is a predetermined smallest capacitance process variation case.

24. Apparatus according to claim 16, wherein the particular signal propagation delay value, for all of the interconnects in the plurality, is the minimum signal propagation delay value Tpd.min,
- and wherein the means for estimating the particular signal propagation delay value for the particular interconnect in dependence upon the particular approximate determination, comprises:
- means for estimating Tpd.min using parameter values determined assuming a predetermined first process variation case, if the particular approximate determination determined that the signal propagation delay time for the particular interconnect is dominated more by the interconnect capacitance than by the product of the interconnect capacitance and the interconnect resistance; and
- for estimating Tpd.min using parameter values determined assuming a predetermined second process variation case if the particular approximate determination determined that the signal propagation delay time for the particular interconnect is not dominated more by the interconnect capacitance than by the product of the interconnect capacitance and the interconnect resistance,
- wherein the capacitance of the particular interconnect is smaller in the first process variation case than in the second process variation case.

25. Apparatus according to claim 24, wherein the first process variation case is a predetermined smallest capacitance process variation case and the second process variation case is a predetermined largest capacitance process variation case.

26. Apparatus according to claim 16, where the signal propagation delay time for the particular interconnect is dominated more by the interconnect capacitance than by the product of the interconnect capacitance and the interconnect resistance,
- wherein the particular interconnect has a source node driven by a source node driver having an equivalent output resistance,
- and wherein the means for estimating the particular signal propagation delay value comprises means for estimating the particular signal propagation delay value for the particular interconnect further in dependence upon a further determination of whether or not the signal propagation delay time for the particular interconnect is dominated more by the equivalent output resistance of the source node driver than by the interconnect capacitance.

27. Apparatus according to claim 26, wherein the signal propagation delay for the particular interconnect is dominated more by the equivalent output resistance of the source node driver than by the interconnect capacitance,
- and wherein the means for estimating the particular signal propagation delay value for the particular interconnect in dependence upon the approximate determination, comprises means for estimating the particular signal propagation delay value for the particular interconnect using parameter values determined assuming a predetermined nominal process variation case.

* * * * *